US011606513B2

(12) United States Patent
Nicholson et al.

(10) Patent No.: US 11,606,513 B2
(45) Date of Patent: Mar. 14, 2023

(54) APPARATUS, METHOD, AND PROGRAM PRODUCT FOR ENHANCING PRIVACY VIA FACIAL FEATURE OBFUSCATION

(71) Applicant: Lenovo (Singapore) PTE. LTD., New Tech Park (SG)

(72) Inventors: John W. Nicholson, Cary, NC (US); Daryl C. Cromer, Raleigh, NC (US); Howard Locker, Cary, NC (US); Mengnan Wang, Chapel Hill, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/362,541

(22) Filed: Jun. 29, 2021

(65) Prior Publication Data

US 2022/0417450 A1    Dec. 29, 2022

(51) Int. Cl.
*H04N 5/272* (2006.01)
*H04N 5/262* (2006.01)
*H04N 5/232* (2006.01)
*G06V 40/16* (2022.01)

(52) U.S. Cl.
CPC ........... *H04N 5/272* (2013.01); *G06V 40/164* (2022.01); *H04N 5/23219* (2013.01); *H04N 5/2621* (2013.01)

(58) Field of Classification Search
CPC .. H04N 5/272; H04N 5/23219; H04N 5/2621; G06K 9/00241
See application file for complete search history.

(56) References Cited

U.S. PATENT DOCUMENTS

| | | | |
|---|---|---|---|
| 8,111,280 B2* | 2/2012 | Kim | H04N 7/142 348/14.01 |
| 9,350,914 B1* | 5/2016 | Kaur | G06T 5/002 |
| 10,623,631 B2* | 4/2020 | Takayama | H04N 5/23245 |
| 10,929,661 B1* | 2/2021 | Manyam | G06K 9/00624 |
| 11,138,778 B2* | 10/2021 | Mysore Siddu | G06K 9/3266 |
| 2007/0200925 A1* | 8/2007 | Kim | G06T 11/00 348/14.08 |
| 2008/0180459 A1* | 7/2008 | Jung | H04N 5/23219 345/647 |
| 2008/0181533 A1* | 7/2008 | Jung | G06K 9/3241 382/283 |
| 2014/0016820 A1* | 1/2014 | Roberts | G06F 16/7854 382/103 |
| 2014/0106710 A1* | 4/2014 | Rodriguez | H04W 4/80 455/411 |
| 2015/0104103 A1* | 4/2015 | Candelore | G06K 9/00288 382/195 |
| 2018/0190032 A1* | 7/2018 | Barnett | G06T 7/70 |
| 2018/0362296 A1* | 12/2018 | Friedli | B66B 1/30 |
| 2020/0042797 A1* | 2/2020 | Lee | H04N 5/44504 |

(Continued)

*Primary Examiner* — Antoinette T Spinks
(74) *Attorney, Agent, or Firm* — Kunzler Bean & Adamson

(57) ABSTRACT

There is disclosed an information handling system, including a camera, which may include an input lens, and an image signal processor, which may include circuitry that converts an analog image received at the input lens to a digital image data structure; a device interface may include circuitry that provides the image data structure to an information handling device, and a modifier circuit that modifies human features of the digital image data structure before the digital image data structure is provided to the device interface.

20 Claims, 5 Drawing Sheets

(56) References Cited

U.S. PATENT DOCUMENTS

| | | | |
|---|---|---|---|
| 2020/0051244 A1* | 2/2020 | Hanina | G16H 10/20 |
| 2020/0118317 A1* | 4/2020 | Mysore Siddu | G06K 9/3266 |
| 2020/0267311 A1* | 8/2020 | Park | H04N 5/23219 |
| 2021/0165917 A1* | 6/2021 | Yu | G06F 21/6245 |

\* cited by examiner

APPARATUS, METHOD, AND PROGRAM PRODUCT FOR ENHANCING PRIVACY VIA FACIAL FEATURE OBFUSCATION

FIELD

The subject matter disclosed herein relates to information handling devices and more particularly relates to enhancing privacy via facial feature obfuscation.

BACKGROUND

Information handling devices, such as desktop computers, laptop computers, tablet computers, smart phones, optical head-mounted display units, smart watches, televisions, streaming devices, etc., are ubiquitous in society. These information handling devices may be used for performing various actions, such as image processing. Image processing apparatuses may, in some cases, compromise user privacy.

BRIEF SUMMARY

A system of one or more computers can be configured to perform particular operations or actions, including enhancing user privacy via facial feature obfuscation, by virtue of having software, firmware, hardware, or a combination of them installed on the system that in operation causes or cause the system to perform the actions. One or more computer programs can be configured to perform particular operations or actions by virtue of including circuitry or instructions that, when executed by data processing apparatus, cause the apparatus to perform the actions. One general aspect includes an information handling device. The apparatus also includes a camera, which may include an input lens, and an image signal processor, which may include circuitry that converts an analog image received at the input lens to a digital image data structure; a device interface may include circuitry that provides the image data structure to an information handling device, and a modifier circuit that modifies human features of the digital image data structure before the digital image data structure is provided to the device interface. Other embodiments of this aspect include corresponding computer systems, apparatus, and computer programs recorded on one or more computer storage devices, each configured to perform the actions of the methods.

Implementations may include one or more of the following features. The apparatus where the modifier circuit may include circuitry that detects and obfuscates facial features. Obfuscating the facial features may include modifying the facial features to make them unrecognizable to an artificial intelligence. Obfuscating the facial features may include identifying a plurality of nodal points, and modifying one or more nodal points of the plurality of nodal points. The plurality of nodal points may include between x and y nodal points. Obfuscating the facial features may include inserting random or pseudorandom distortion into the digital image data structure. Obfuscating the facial features may include inserting graphical elements into the digital image data structure. The device interface may include a software driver, and at least a portion of the image modifier is implemented in the software driver. The apparatus may include a hardware switch to enable the image modifier. The camera is a web camera for a computer. The computer may include the web camera. Implementations of the described techniques may include hardware, a method or process, or computer software on a computer-accessible medium.

One general aspect includes a program product may include a computer-readable storage medium that stores code executable by at least one processor. The program product also includes receiving an image at a camera. The product also includes obfuscating facial features from the image to produce a modified digital image data structure. The product also includes providing the modified digital image data structure to a processor connected to the camera. Other embodiments of this aspect include corresponding computer systems, apparatus, and computer programs recorded on one or more computer storage devices, each configured to perform the actions of the methods.

Implementations may include one or more of the following features. The program product where obfuscating the facial features may include modifying the facial features to make them unrecognizable to an artificial intelligence. Obfuscating the facial features may include identifying a plurality of nodal points, and modifying one or more nodal points of the plurality of nodal points. The executable code further may include code to provide a software driver. The plurality of nodal points may include between x and y nodal points. Obfuscating the facial features may optionally include inserting random or pseudorandom distortion into the digital image data structure. Obfuscating the facial features may include inserting graphical elements into the digital image data structure. Implementations of the described techniques may include hardware, a method or process, or computer software on a computer-accessible medium.

One general aspect includes. The method also includes receiving an image at a camera. The method also includes obfuscating facial features from the image to produce a modified digital image data structure. The method also includes providing the modified digital image data structure to a processor connected to the camera. Other embodiments of this aspect include corresponding computer systems, apparatus, and computer programs recorded on one or more computer storage devices, each configured to perform the actions of the methods.

Implementations may include one or more of the following features. The method where obfuscating the facial features may include identifying a plurality of nodal points, and modifying one or more nodal points of the plurality of nodal points. Implementations of the described techniques may include hardware, a method or process, or computer software on a computer-accessible medium.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
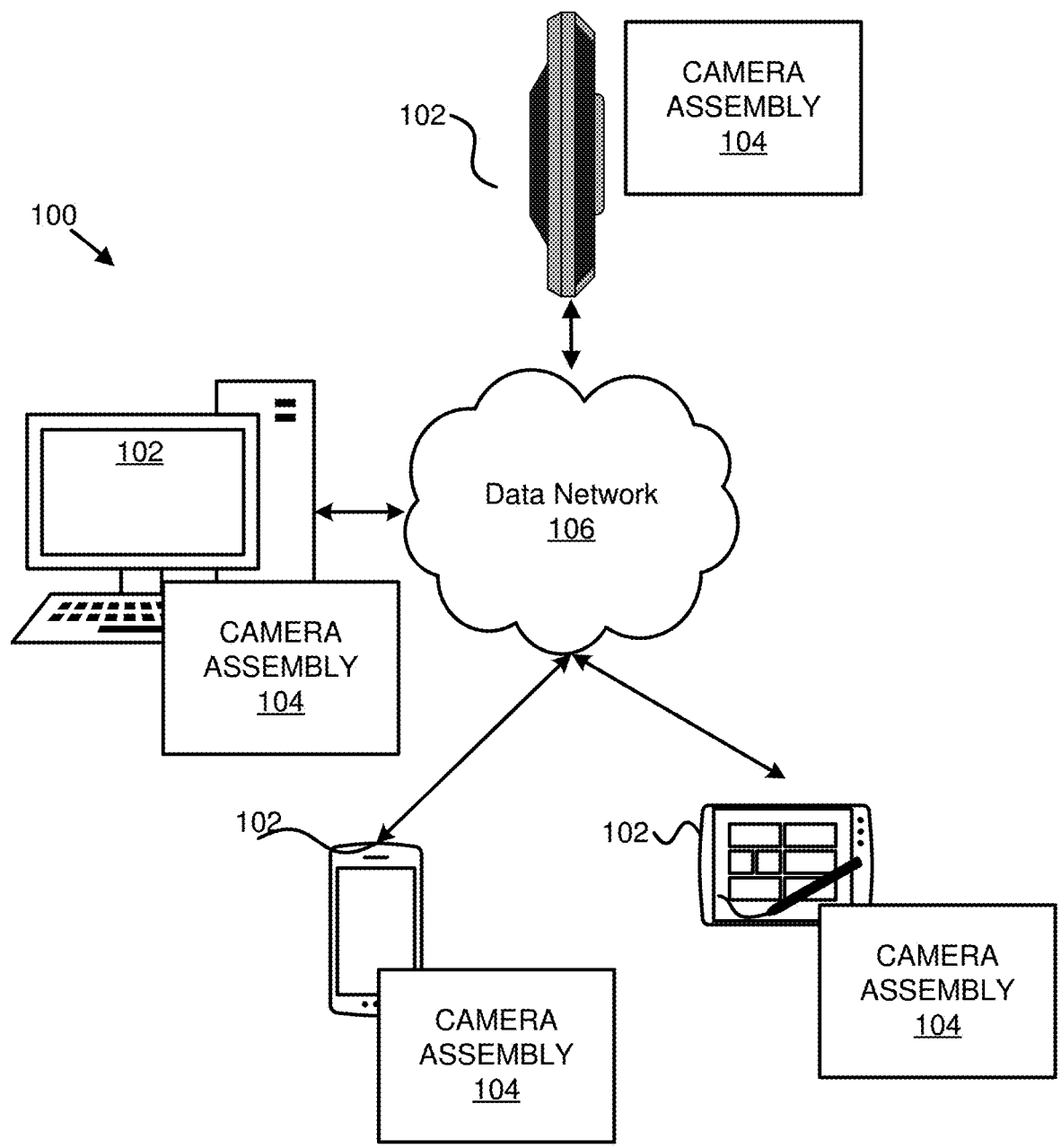
FIG. 1 is a schematic block diagram illustrating one embodiment of a system for enhancing user privacy.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer-readable storage devices storing machine readable code, computer-readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module, and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer-readable storage devices. Where a module or portions of a module are implemented in software, the software portions are stored on one or more computer-readable storage devices.

Any combination of one or more computer-readable medium may be utilized. The computer-readable medium may be a computer-readable storage medium. The computer-readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of preceding figures. Like numbers refer to like elements in all figures, including alternate embodiments of like elements.

FIG. 1 depicts one embodiment of a system 100 for enhancing user privacy via facial feature obfuscation. In one embodiment, the system 100 includes information handling devices 102, camera assembly 104, and data networks 106. Even though a specific number of information handling devices 102, camera assemblies 104, and data networks 106 are depicted in FIG. 1, one of skill in the art will recognize that any number of information handling devices 102, camera assemblies 104, and data networks 106 may be included in the system 100.

In one embodiment, the information handling devices 102 include computing devices, such as desktop computers, laptop computers, personal digital assistants (PDAs), tablet computers, smart phones, cellular phones, smart televisions (e.g., televisions connected to the Internet), set-top boxes, game consoles, security systems (including security cameras), vehicle on-board computers, network devices (e.g., routers, switches, modems), streaming devices, digital assistants (e.g., public digital assistants), or the like. In some embodiments, the information handling devices 102 include wearable devices, such as smart watches, fitness bands, optical head-mounted displays, or the like. The information handling devices 102 may access the data network 106 directly using a network connection.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a WAN, a storage area network ("SAN"), a LAN, an optical fiber network, the Internet, or other digital communication network. The data network 106 may include two or more networks. The data network 106 may include one or more servers, routers, switches, and/or other networking equipment. The data network 106 may also include computer-readable storage media, such as a hard disk drive, an optical drive, non-volatile memory, RAM, or the like.

Figure 2:
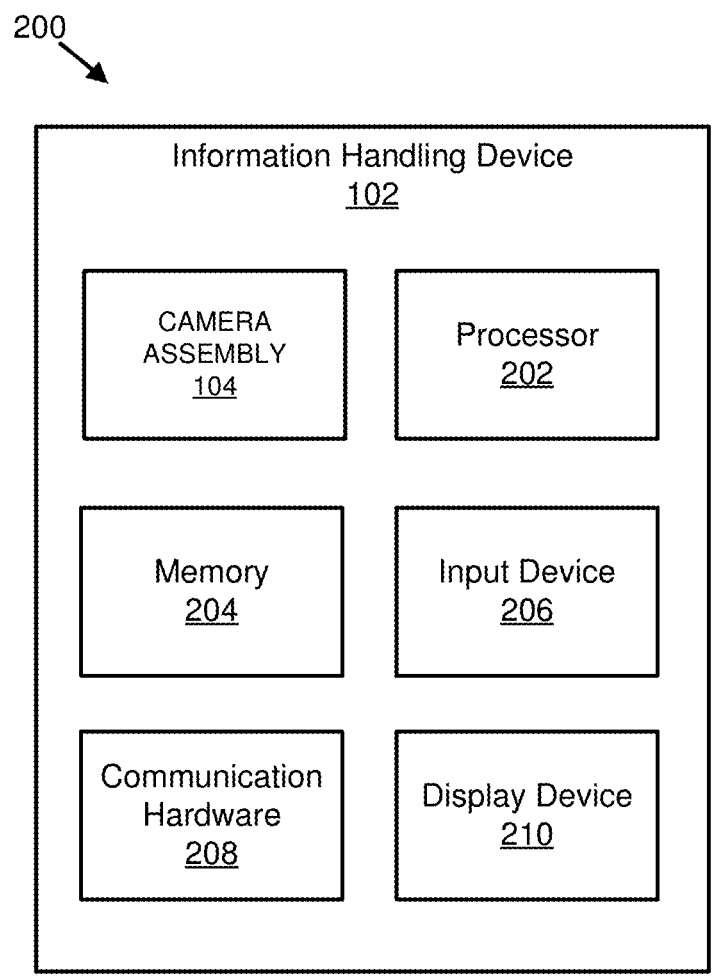
FIG. 2 is a schematic block diagram illustrating one embodiment of an apparatus including a camera assembly.

FIG. 2 depicts one embodiment of an apparatus 200 that may be used for enhancing privacy by obfuscating facial recognition features. The apparatus 200 includes one embodiment of the information handling device 102. Furthermore, the information handling device 102 may include the camera assembly 104, a processor 202, a memory 204, an input device 206, communication hardware 208, and optionally a display device 210. In some embodiments, the input device 206 and the display device 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the camera assembly 104, the input device 206, the communication hardware 208, and the display device 210.

The memory 204, in one embodiment, is a computer-readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores configuration information. In some embodiments, the memory 204 also stores program code and related data, such as an operating system or other controller algorithms operating on the information handling device 102, and may also provide drivers or other software interfaces.

The information handling device 102 may use the camera assembly 104. As may be appreciated, the camera assembly 104 may include hardware, computer, or a combination of both hardware and software. In some embodiments, camera assembly 104 may also include an interface to information handling device 102, including a physical interface, such as a bus, including peripheral component interconnect express (PCIe), universal serial bus (USB), or other communication medium. For example, the camera assembly 104 may include circuitry, or the processor 202, used to receive, by use of at least one processor (e.g., the processor 202), to obfuscate facial features of a user. As another example, the camera assembly 104 may include computer program code (which may optionally be a low-level driver, running in the operating system, or running on camera assembly 104) that may perform image processing, including image obfuscation.

The input device 206, in one embodiment, may include any known computer input device including a touch panel, a button, a keyboard, a stylus, a microphone for receiving audio input (e.g., or another audio input device for receiving audio input), or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting images, text, or the like to a user. As another, nonlimiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, a streaming device, or the like.

In certain embodiments, the display device 210 includes one or more speakers for producing sound. For example, the display device 210 may produce an audible alert or notification (e.g., a beep or chime). In some embodiments, the display device 210 includes one or more haptic devices for producing vibrations, motion, or other haptic feedback. For example, the display device 210 may produce haptic feedback upon performing an action.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the camera assembly 104.

The information handling devices 102 may include an embodiment of the camera assembly 104. In certain embodiments, user privacy may be enhanced via image obfuscation, including obfuscation of facial images. A common practice related to users of information handling devices is to ask the user to fill out a form providing certain information when the user accesses a resource, such as a web site or installed software on a computer. The information may include, for example, e-mail, name, address, birthday, or other personal information. In the case of directly soliciting such information, the user has clear knowledge and consent of the information that is collected. In fact, the user can (and sometimes does), deliberately select certain information not to provide, or even provide false information to protect privacy.

As artificial intelligence (AI) and computer vision (CV) systems become ever more capable and ubiquitous, users may lose the privacy protection of controlling which date they provide when. AI and CV systems may be capable of gathering biometric information without the user's knowledge or consent. If legally-cognizable "consent" does exist, it may be practically ineffective. For example, the consent may be buried in a legally-dense end-user license agreement (EULA) that the user never read, would not have understood if they had read it, and is probably an "adhesion contract"—meaning that even if the user read and understood it, the contract is provided on a "take it or leave it" basis, with no negotiation.

The provider of the resource may then estimate information about the user based on AI and/or CV, including for example age, sex, or race. These data may be determined immediately on-device via image processing. By connecting to a cloud service or database, additional information about the user may be ascertainable, such as name, address, sex, age, weight, ethnicity, friends' lists, preferences, purchase habits, affiliations, and other highly-personal information via a large, linked network of advertisement, and data services. Furthermore, depending on the device and its available sensors, information such as stress level, heartrate, blood pressure, perspiration, and others may be collected. Furthermore, the user may not know that these data are being collected, or may not realize the extent of data collection and linkage.

A popular AI and CV solution for those seeking to collect data about users is facial recognition. Facial recognition can be used for many purposes, at least some of which may be contrary to the user's desires. While facial recognition has many uses, an illustrative use case is instructive. In an example, facial recognition may be used to ascertain a user's identity, and then link the user to advertisement and data collection networks. Some privacy-conscious users may try to spoof facial recognition with a static photograph, but advanced algorithms may now include a liveness detection as well. In those cases, the AI may observe a sequence of frames instead of a single frame, to determine whether the image exhibits slight variations that indicate liveness. Furthermore, periodic recognition may be used as a means of verifying that a recognition is valid from one frame to the next.

Contemporary solutions can apply facial recognition to virtually any video data stream, including video conferencing. Some less reputable websites or applications may even access, or attempt to access, a user's web camera surreptitiously. For example, the user may grant the application access to the web camera for one purpose, and the application may access the camera at other times without notifying the user. The application may also user video capture data (such as facial recognition) for purposes that the user does not expect or anticipate.

Some existing obfuscation technologies have contextually-limited utility. For example, certain clothing and masks are manufactured for obfuscating a user's identity in public. While these are partly effective in public (such as with the use of closed-circuit television (CCTV) cameras), users may not expect to wear them at all times, such as when operating their own devices. Furthermore, wearing such a device may defeat an intended use of a web camera. For example, if the user is participating in a video conference, the user may intend for the other users to recognize him or her, while simultaneously wanting to prevent recognition from facial recognition databases.

Figure 3:
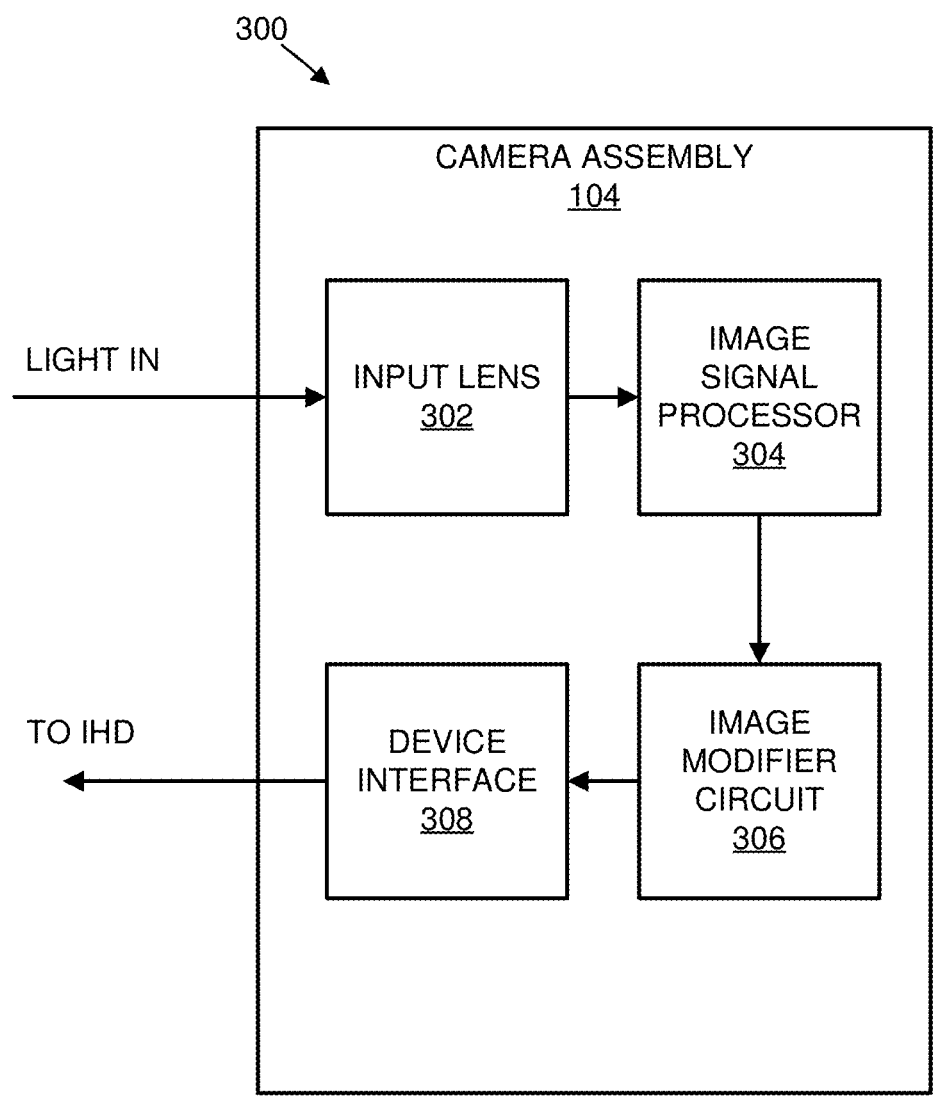
FIG. 3 is a schematic block diagram illustrating one embodiment of an apparatus including submodules of a camera assembly.

FIG. 3 depicts a schematic block diagram illustrating one embodiment of an apparatus 300 (e.g., information handling device 102) that includes one embodiment of the camera assembly 104. This figure also provides an illustrative information processing pipeline, illustrated by arrows proceeding from one element to another. The illustrated information processing pipeline is provided as an example only, and information need not be processed in the same order as illustrated here.

In this embodiment, camera assembly 104 includes an input lens 302, image signal processor 304, image modifier circuit 306, and device interface 308.

In various embodiments, facial recognition solutions may start by detecting a face. Then the facial recognition system may determine, for example, the head's position, size, pose, and unique characteristics. A human face may have various distinguishable landmarks, such as the peaks, valleys, lengths, radius, and other dimensions of various facial features. In AI and CV processing, these landmarks are called nodal points. A human has approximately 80 nodal points, which may be measured to an accuracy of a sub-millimeter scale. Nonlimiting examples of nodal points include distance between the eyes, width of the nose, depth of the eye sockets, shape of the cheekbones, and length of the jaw line. An AI feature extractor may assign a numeric value to each nodal point, and the AI may use these values to search a facial database for a match. In a black-box learning system, the AI may learn these nodal points, even if it is not specifically trained on them.

Embodiments of camera assembly 104 may be configured to enhance user privacy by obfuscating certain features in a way that frustrates an AI's recognition algorithm. Optionally, changes may be made in such a way that a face, although difficult for an AI to recognize, is still recognizable to a human familiar with the face. In some embodiments, the obfuscation algorithm described herein affects only certain portions of the face (such as by altering certain nodal points, but not others), by selectively obfuscating certain features, such as by introducing visual artifacts into those features, or by operating only on selected frames of an image stream. These techniques may defeat certain facial recognition AIs, while helping to preserve aspects of an image that make it recognizable to humans.

Input lens 302 is, for example, an optical lens that receives light from the ambient environment, which forms an image on input lens 302. Various forms of input lenses may be used. For example, input lens 302 may be a single-element lens, with a single meniscus lens, or may be a complex lens with 20 or more lens elements, used for zoom and other corrections. Input lens 302 may also be a combination or plurality of lenses, such as a basic single-element lens enhanced by a more complex multi-element lens. Input lens 302 may also include other elements, such as focusing elements, shutters, hoods, mirrors, enhancers, motors (e.g., tilt, shift, zoom, pan), anti-fog features, lens covers, treatments, films, sliders, or other elements, all of which may be considered part of input lens 302.

In embodiments, image signal processor 304 performs basic processing on the input image, and converts the input image to an appropriate digital format. For example, image signal processor 304 may have circuitry to convert the image to a raw image format, and may optionally include circuitry and/or code to compress or otherwise modify the digital image. Various raw and compressed image formats are known in the art. By way of illustrative and nonlimiting example, image formats may include JPEG/JFIF, JPEG 2000, Exif, TIFF, GIF, bitmap, portable network graphics, PPM, PGM, PBM, PNM, WebP, HDR raster formats, HEIF, BAT, CGM, Gerber format, SVG, and others.

In embodiments, image modifier circuit 306 may include circuitry to detect facial features within the image provided by image signal processor 304, and modify features, so as to obfuscate the user's identity for user privacy purposes or for other purposes. Image modifier circuit 306 provide the modified image to device interface 308. Image modifier circuit 306 includes at least one hardware logic gate, which may be hardware programmed, may be reconfigurable (as in the case of an FPGA), or may be software programmable, in which case image modifier circuit 306 may include both the hardware circuitry, and the software instructions that program the hardware circuitry.

In embodiments, device interface 308 includes hardware and software interfaces to communicatively couple camera assembly 104 to information handling device 102, and provide the modified image to information handling device 102. In embodiments, image modifier circuit 306 may be provided in hardware, such as within image signal processor 304, or in software, such as in a driver for device interface 308. To protect user privacy, and to discourage tampering, image modifier circuit 306 may be placed in the illustrated pipeline in a position where the image is modified before it is usefully provided to an application layer for example of an operating system of information handling device 102. For example, image modifier circuit 306 may be provided in hardware circuitry within image signal processor 304, or within firmware, and/or software of image signal processor 304. Image modifier circuit 306 may also be provided as part of device interface 308, in hardware circuitry, firmware, and/or software. Alternatively, image modifier circuit 306 may include executable software instructions provided to a processor of information handling device 102, and may form part of a low-level driver to allow information handling device 102 to interface with camera assembly 104. In embodiments, this low-level driver may be provided an operating system level, such as at the kernel or driver space, so that the image is modified before the image is provided to a user space of the operating system, where an AI or CV algorithm may operate on it.

Figure 4:
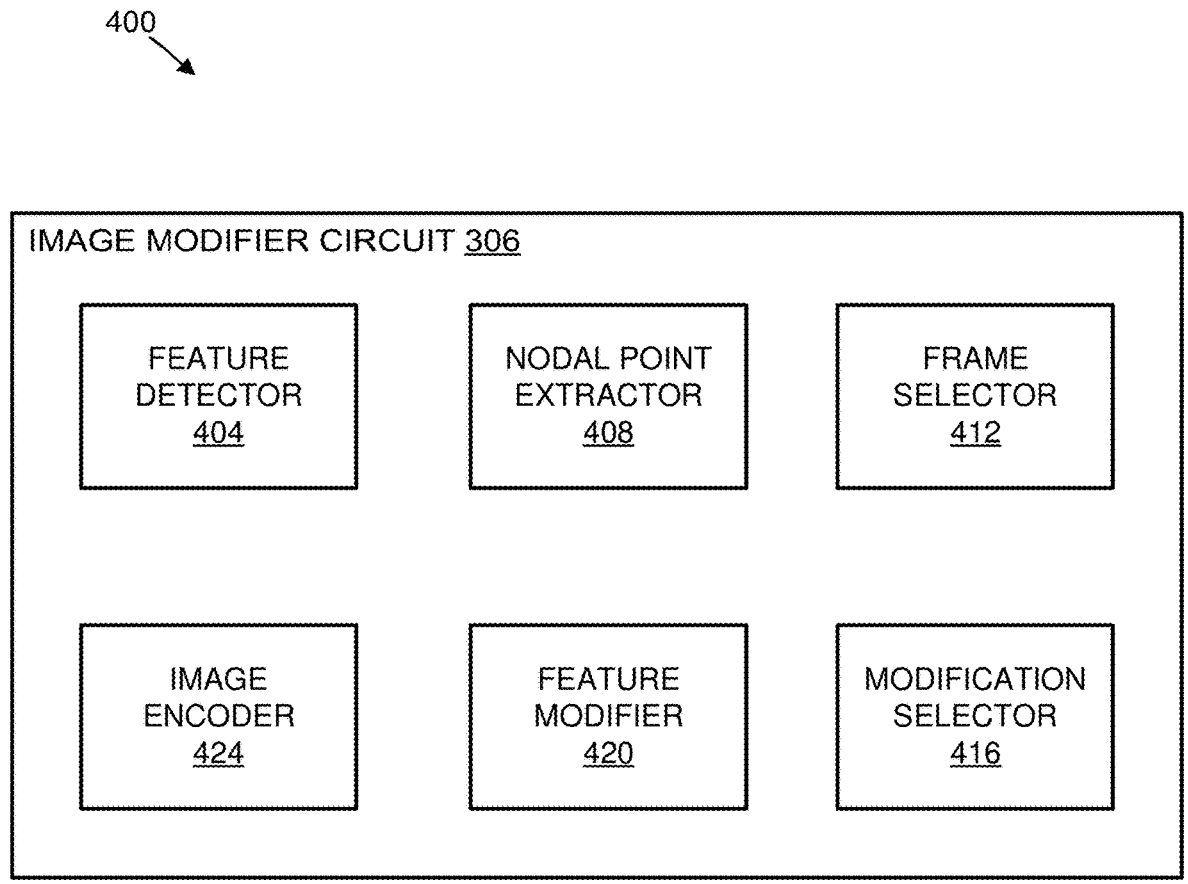
FIG. 4 is a schematic block diagram illustrating another embodiment of an apparatus including an image modifier circuit.

FIG. 4 is a schematic block diagram illustrating another embodiment of an apparatus 400 that includes one embodiment of the image modifier circuit 306. Image modifier circuit 306 includes, in an embodiment, feature detector 404, nodal point extractor 408, frame selector 412, modification selector 416, feature modifier 420, and image encoder 424.

In an embodiment, image modifier circuit 306 detects the face and creates features, such as the 80 nodal points that a facial recognition solution may use. Some or all of the 80 nodal points may be slightly changed, or greatly exaggerated, in some or all frames, to make it difficult for a facial recognition AI to detect the face. In embodiments, the changes may not be so drastic that a human familiar with the face will fail to recognize the face. Image modifier circuit 306 may then re-render the face using the changed features. This modified version of the face may then be provided to the operating system, or to the user space of the operating system. In another embodiment, random distortions may be inserted in the image, without specifically modifying the face or its nodal points. Yet another embodiment introduces a graphical element into the camera stream, which may be selected to cause a facial recognition AI to fail.

In another embodiment, the image may be mechanically altered by an element, such as input lens 302, which may include an optical lens or filter to alter the image. In an embodiment, this may be an adaptive optics lens, which may be deformable in response to an electrical stimulus, which may be provided by image modifier circuit 306. Adaptive optics may be used to correct distorted image, but in this embodiment, they may be used instead to distort a true image to defeat facial recognition AI or CV systems. Alternatively, a static lens filter may be permanently placed, or selectively moved (manually by a user, or via an electric motor), over input lens 302. In another embodiment, a filter with a slight kaleidoscopic effect may be placed over input lens 302, and may be gradually mechanically rotated, to introduce time-varying distortions.

In an embodiment, image modifier circuit 306 receives an image in a digital image format, such as from image signal processor 304. This may be in a format usable by image modifier circuit 306, or image modifier circuit 306 may process the image into a usable format.

In an embodiment, feature detector 404 scans the digital image to detect a portion of the image that includes a face. Feature detector 404 may also determine, for example, the head position, size, pose, unique characteristics, and other information about the face. Feature detector 404 may provide the image, and metadata about the image (identifying, for example, regions that represent various features) to nodal point extractor 408.

In an embodiment, nodal point extractor 408 creates nodal points, such as the 80 nodal points used for facial recognition solutions. Nodal point extractor 408 may also measure the nodal points to provide the correct nodal point measurements.

In an embodiment, frame selector 412 may select, from a plurality of available frames within a video stream, one or more frames for modification. Frames may be selected randomly, pseudo-randomly, at regular intervals, at irregular intervals, or on any other suitable algorithm. Frame selector 412 may be configured to sample enough frames from the video stream to usefully obfuscate the image so that it is difficult for an AI or CV system to detect the face. Frame selector 412 may also include an upper boundary of frames to select, so that the image is still recognizable to a human observer. In another embodiment, no upper bound is provided for the number of frames selected, and as many as all available frames may be selected for modification.

Modification selector 416 may also select certain modifications to make. Modification selector 416 may select, for example, certain nodal points whose values may be altered, such as according to an algorithm. The modification may be, for example, a random or pseudorandom multiplier used to distort the features sufficiently that they are not recognized by an AI or CV system. Modification selector 416 may operate on a fixed set of nodal points (e.g., depth of eye sockets, distance between eyes, width of the nose, shape of cheekbone, and length of jawline, or other selected nodal features). Alternatively, modification selector 416 may select nodal features according to an algorithm, such as randomly, pseudo-randomly, round-robin, or other.

Modification selector 406 and frame selector 412 need not both be present in every embodiment. Alterations may be introduced into every frame, but there may be different alterations in every frame, which may aid in making the image recognizable to a human observer. In another embodiment, frame selector 412 selects certain frames and severely distorts those frames, while other frames are left undisturbed. Alternatively, modification selector 416 may carefully select and/or alternate modifications to various features or nodal points, so that the modification can be provided in every frame. Either of these may provide an image that is recognizable to a human observer, though the distortion may be visible. In embodiments, user-selectable controls may be provided (such as via a graphical user interface or hardware switch) to enable or disable feature distortion, so that the human user has the option to present an unmodified image when it is desirable to do so.

In yet other embodiments, maintaining human recognizability is not a concern, and frame selector 412 and/or modification selector 416 may severely distort the facial image, in many frames or every frame, to more nearly ensure that an AI or CV algorithm is defeated. This feature may also be controlled via a hardware switch or user interface.

Once features and/or frames are selected, feature modifier 420 operates on the selected frame and/or selected features to modify those frames and/or features. For example, feature modifier 420 may multiply certain nodal point values by a modifier that is either greater than one or less than one, to respectively stretch or shrink the feature. Feature modifier 420 may need to only slightly change certain features to defeat a facial recognition system so that the facial recognition system will not match the face. Advantageously, feature modifier 420 may modify the features in a way that the face is still recognizable to a human observer.

Image encoder 424 may re-render the image, including the face, using the changed values provided by feature modifier 420. The output result of image encoder 424 can then be provided to information handling device 102, where an AI or CV algorithm operating in software or even in the operating system may not be able to successfully perform facial recognition on the person.

In other embodiments, image modifier circuit 306 may introduce graphical elements into the camera stream, which may cause a facial recognition algorithm to fail. For example, certain images, textiles, or distortions may be overlaid into the image stream, to obfuscate a person's face. For example, feature detector 404 may identify a face, frame selector 412 may identify certain frames to obfuscate (up to and including all frames), and feature modifier 420 may overlay certain pixels or graphical elements onto the image stream. These pixels or graphical elements may not recognizable as a human face to an AI. Depending on configuration, which may in some examples be a user configuration, this obfuscation could be provided in every frame, in which case the image may but not be recognizable to a human observer. In that case, defeat of an AI algorithm is more reliably assured. In other cases, visual artifacts may be introduced only into some selected frames. A human observer may recognize jitter in the stream, but may still be able to recognize the face based on non-obscured frames. Even with jitter, a human user (such as on a video call) may be able to recognize the face, and interact normally, while an AI or CV system may be confused by the occasional frames in which the human face is obfuscated.

Figure 5:
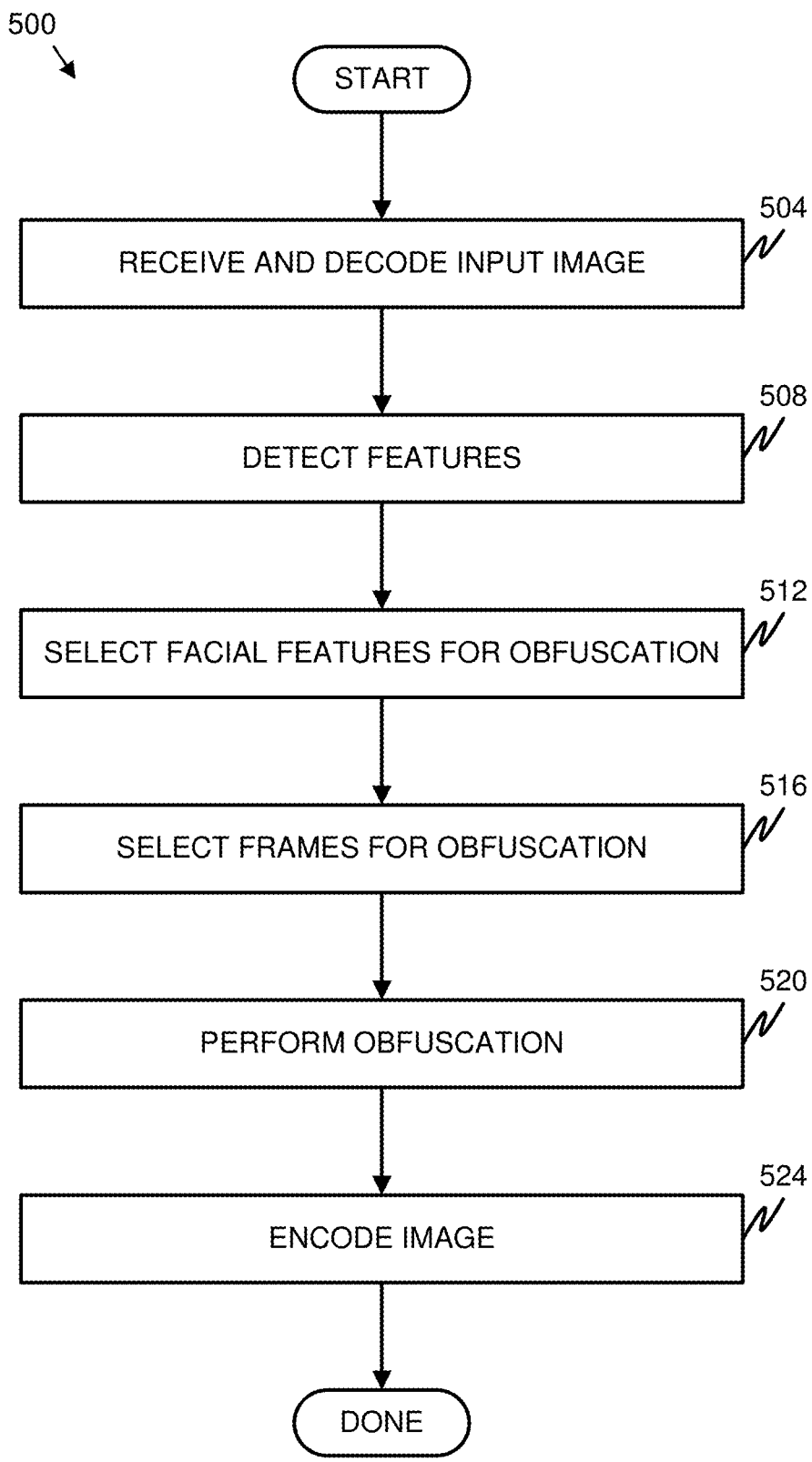
FIG. 5 is a schematic flow chart diagram illustrating an embodiment of a method for enhancing user privacy.

FIG. 5 is a schematic flow chart diagram illustrating an embodiment of a method 500 for obfuscating an image. Method 500 may be carried out, for example, by a camera assembly 104, or by various elements of an information handling device 102.

In block 504, a system or subsystem, such as image modifier circuit 306, receives and decodes an input image. Decoding the input image may include, for example, digitizing the image, converting the input image from one format to another, rendering the image, or otherwise making the image usable to the system or subsystem.

In block 508, the system detects certain features (e.g., facial features of a person's face or other features of the image), such as by extracting the 80 nodal points, or by using some other facial recognition algorithm, system, or device to identify which portions of the image represent a face.

In block 512, certain facial features are selected for obfuscation. These facial features may include only a few selected nodal points, or may include the entire facial region, including all nodal points. In other embodiments, all or part of the face may be selected for overlay with a graphical element or tile.

In block 516, certain frames may also be selected for obfuscation. In some embodiments, exactly one of frames or features (nodal points) are selected for obfuscation. In other embodiments, some features are selected for obfuscation in each frame, which may be the same features in each frame, or different features from frame to frame. In other embodiments, all features are selected for obfuscation in every frame. In other embodiments, all frames are selected at different times, all features are selected at different times, or combinations of some features, all features, some frames, and all frames may be used across the entire video stream, or at different times within the video stream.

In block 520, the system performs the obfuscation, such as by modifying certain nodal points, and/or modifying selected frames.

In block 524, the system re-encodes the image, such as by encoding the image into a format usable by information handling device 102. The encoded image may then be provided to a device, such as information handling device 102.

The method is then done.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a camera comprising an input lens, and an image signal processor comprising circuitry that converts all of an analog image received at the input lens to a digital image data structure;
a device interface comprising circuitry that provides the digital image data structure to an information handling device; and
a modifier circuit that modifies features of the digital image data structure before the digital image data structure is provided to the device interface, wherein a single on/off switch implemented as a hardware switch or via a graphical user interface comprises a first switch selection and a second switch selection, the first switch selection activates the modifier circuit so that facial features of all faces in the digital image data structure are modified, and the second switch selection deactivates the modifier circuit so that the facial features of the faces in the digital image data structure are not modified.

2. The apparatus of claim 1, wherein the features are human features.

3. The apparatus of claim 1, wherein the modifier circuit comprises circuitry that detects and obfuscates the facial features.

4. The apparatus of claim 3, wherein obfuscating the facial features comprises modifying the facial features to make them unrecognizable to an artificial intelligence.

5. The apparatus of claim 3, wherein obfuscating the facial features comprises identifying a plurality of nodal points, and modifying one or more nodal points of the plurality of nodal points.

6. The apparatus of claim 3, wherein obfuscating the facial features comprises inserting random or pseudorandom distortion into the digital image data structure.

7. The apparatus of claim 3, wherein obfuscating the facial features comprises inserting graphical elements into the digital image data structure.

8. The apparatus of claim 3, wherein the device interface comprises a software driver, and at least a portion of the modifier circuit is implemented in the software driver.

9. The apparatus of claim 1, further comprising the hardware switch to enable the image modifier.

10. The apparatus of claim 1, wherein the camera is a web camera for a computer.

11. The apparatus of claim 10, further comprising a computer, wherein the computer comprises the web camera.

12. A program product comprising a computer-readable storage medium that stores code executable by at least one processor, the executable code comprising code to perform:
receiving an image at a camera;
receiving a first switch selection, wherein a single on/off switch implemented as a hardware switch or via a graphical user interface comprises the first switch selection and a second switch selection, the first switch selection activates obfuscation of facial features of all faces in all of the image, and the second switch selection deactivates the obfuscation of the facial features of the faces;
in response to receiving the first switch selection, obfuscating features from the image to produce a modified digital image data structure; and
providing the modified digital image data structure to a processor connected to the camera.

13. The program product of claim 12, wherein the features are human facial features.

14. The program product of claim 13, wherein obfuscating the human facial features comprises modifying the facial features to make them unrecognizable to an artificial intelligence.

15. The program product of claim 13, wherein obfuscating the human facial features comprises identifying a plurality of nodal points, and modifying one or more nodal points of the plurality of nodal points.

16. The program product of claim 12, wherein the executable code further comprises code to provide a software driver.

17. The program product of claim 13, wherein obfuscating the human facial features comprises inserting random or pseudorandom distortion into the digital image data structure.

18. The program product of claim 13, wherein obfuscating the human facial features comprises inserting graphical elements into the digital image data structure.

19. A method comprising:

receiving an image at a camera;

receiving a first switch selection, wherein a single on/off switch implemented as a hardware switch or via a graphical user interface comprises the first switch selection and a second switch selection, the first switch selection activates obfuscation of facial features of all faces in all of the image, and the second switch selection deactivates the obfuscation of the facial features of the faces;

in response to receiving the first switch selection, obfuscating facial features from the image to produce a modified digital image data structure; and providing the modified digital image data structure to a processor connected to the camera.

20. The method of claim 19, wherein obfuscating the facial features comprises identifying a plurality of nodal points, and modifying one or more nodal points of the plurality of nodal points.

* * * * *